United States Patent [19]

Hasegawa

[11] Patent Number: 4,640,857

[45] Date of Patent: Feb. 3, 1987

[54] PLYWOOD

[75] Inventor: Katsuji Hasegawa, Ohbu, Japan

[73] Assignee: Meinan Machinery Works, Inc., Aichi, Japan

[21] Appl. No.: 460,774

[22] Filed: Jan. 25, 1983

[30] Foreign Application Priority Data

Jan. 30, 1982 [JP] Japan .................................. 57-13600

[51] Int. Cl.$^4$ ............................................. B32B 21/14
[52] U.S. Cl. ...................................... 428/57; 156/157; 428/60; 428/537.1
[58] Field of Search ................ 428/57, 60, 130, 537.1, 428/541; 156/157, 299, 254

[56] References Cited

U.S. PATENT DOCUMENTS

| | | | |
|---|---|---|---|
| 2,452,740 | 11/1948 | Fairchild | 428/130 |
| 2,710,276 | 6/1955 | Mottet et al. | 428/130 X |
| 3,730,816 | 5/1973 | Crawford | 156/299 X |
| 3,890,754 | 6/1975 | Spurdle | 52/211 X |
| 3,963,552 | 6/1976 | Troutner et al. | 156/299 |
| 3,999,338 | 12/1976 | Behan, Jr. et al. | 52/90 X |
| 4,084,996 | 4/1978 | Wheeler | 428/171 X |
| 4,106,246 | 8/1978 | LaFountaine | 52/169.7 X |
| 4,242,390 | 12/1980 | Nemeth | 428/60 X |
| 4,507,162 | 3/1985 | Iwamoto | 428/57 X |

FOREIGN PATENT DOCUMENTS 1143038 2/1969 United Kingdom .................. 428/60

Primary Examiner—Henry F. Epstein

[57] ABSTRACT

Improved and novel structure of plywood is disclosed which makes it possible to use such veneers that are too short for a desired length of plywood panel and to provide joint which can exhibit improved strength over heretofore. The plywood of the invention includes a standard portion where a required number of plies of veneer are laminated together and at least one joint portion where short veneers in any of said plies are lapped at their adjacent longitudinal ends.

5 Claims, 95 Drawing Figures

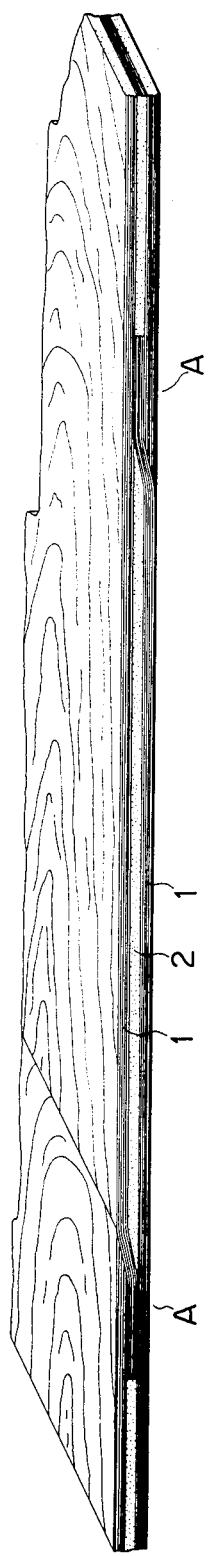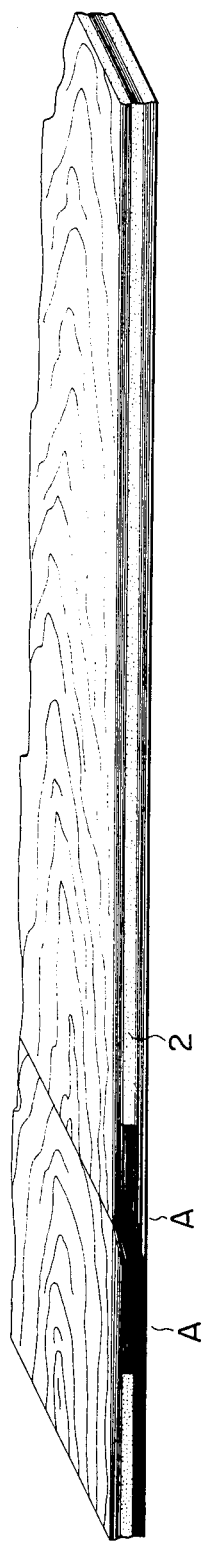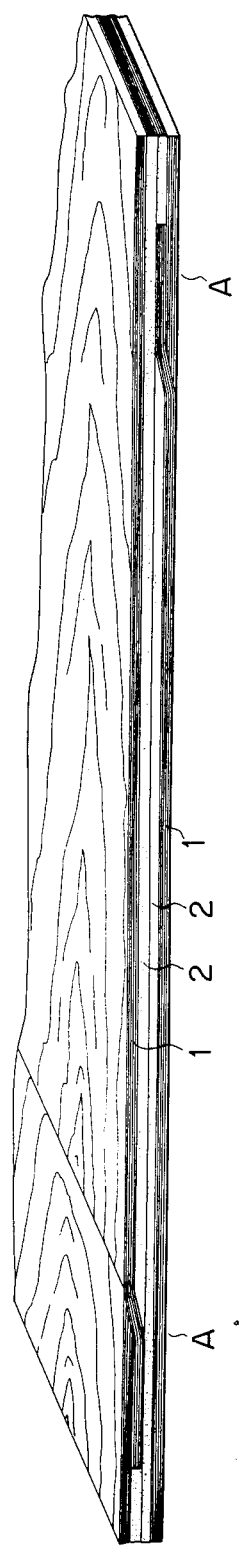

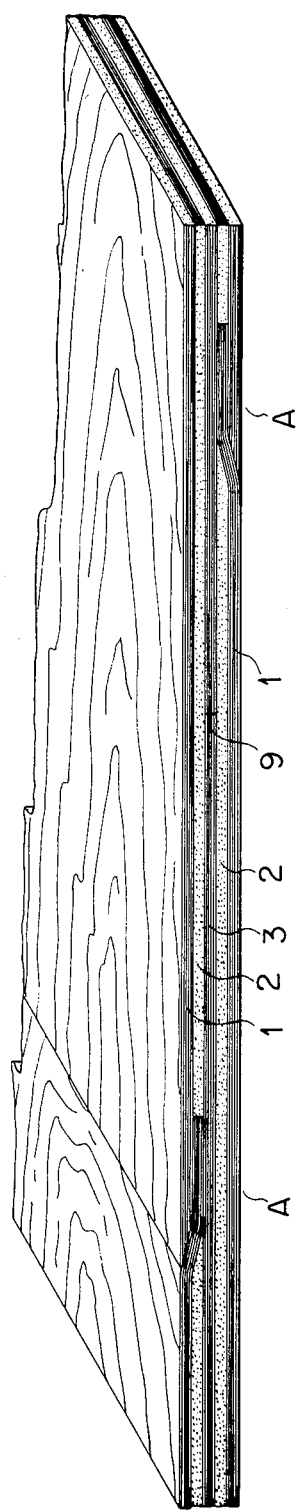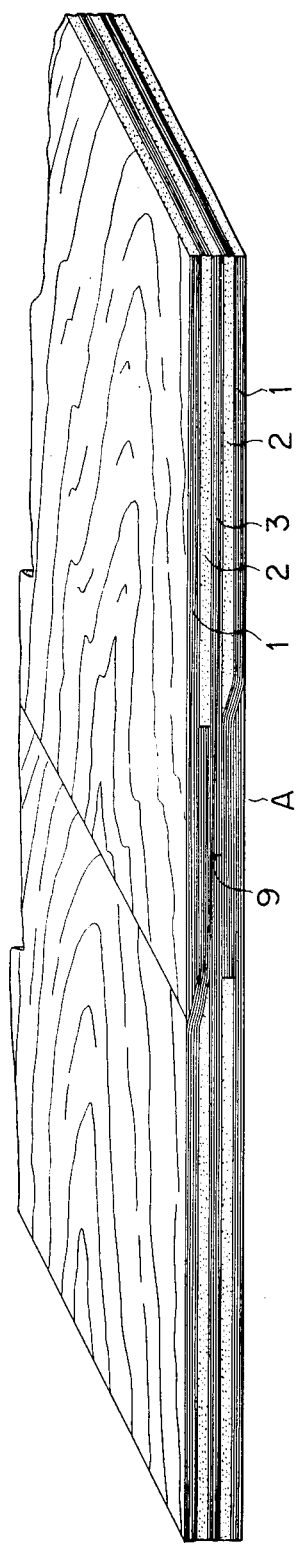

FIG. 59
FIG. 60
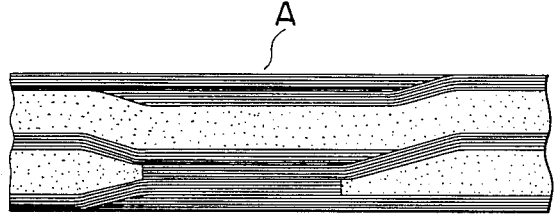
FIG. 62
FIG. 63
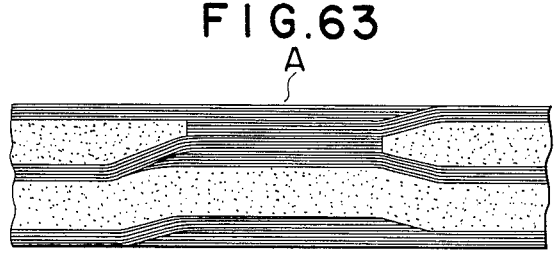
FIG. 64
FIG. 65
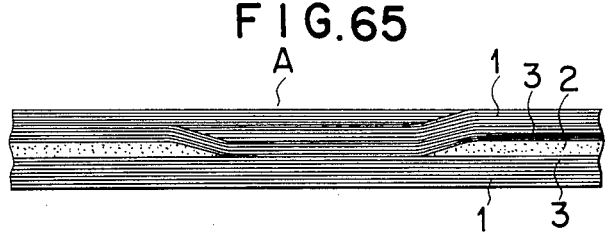

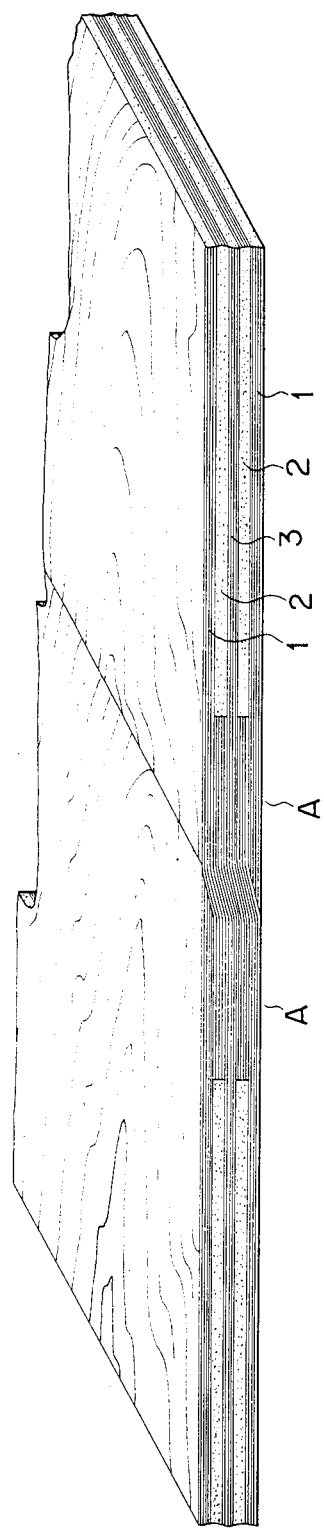
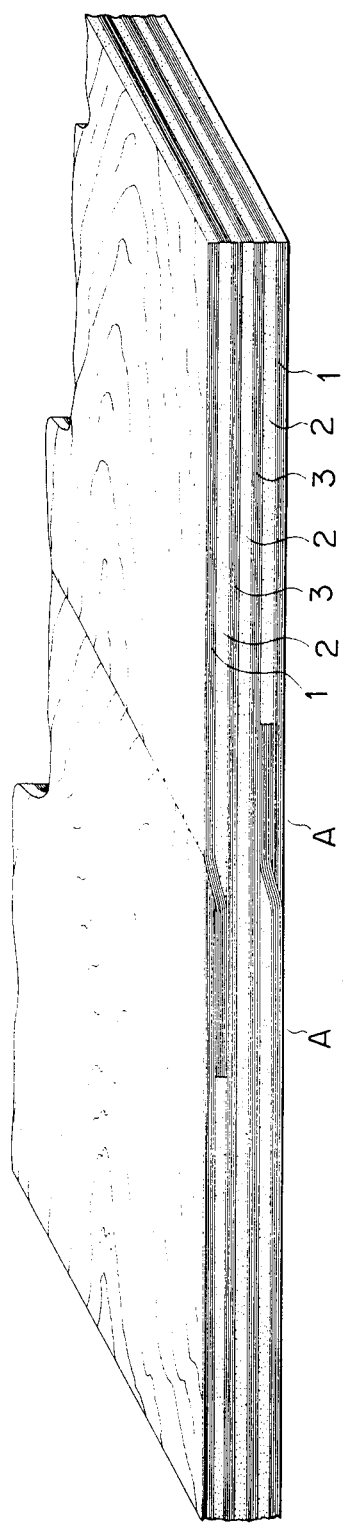

PLYWOOD

BACKGROUND OF THE INVENTION

The present invention relates, in general, to plywood itself. More specifically, it relates to improved and novel stratified structure of plywood composed of veneers any of which are short for any given desired lengths of plywood panel.

In a plywood panel which is composed of any desired plural number of plies of veneer glued together into a stratified form, its component veneers include uppermost and lowermost plies of the plywood panel which are usually referred to as the face veneer and back veneer, respectively, and thus constitute the opposite top and bottom faces of the panel. For the sake of reference simplicity, these face and back may be referred to collectively merely as the "face veneers" simply because the face and the back are distinguished from each other especially when the plywood is irreversible for any specific purpose of application. Other component plies of veneer interposed between the faces and therefore constitute the inner layer of plywood include those veneers which have grain running substantially in the same direction as the faces and are referred to as the "longitudinal veneer", and those veneers whose grain runs substantially at a right angle with respect to the grain of the faces and which are referred to as the crossband or "cross veneer". In the manufacture of plywood, it is a usual practice to employ veneers of lower grade for the latter longitudinal and cross veneers because they are arranged so as to form the invisible inner layer of plywood panel.

It has been known heretofore, in manufacturing plywood with any desired lengths that veneer short for desired lengths is end-jointed by any of the joint forms such as butt joint, scarf joint, finger joint, etc., and the plies of such veneer are arranged and then glued together thereby to assemble a plywood panel of the desired lengths. However, any of these conventional joints have presented a crucial disadvantage or drawback in that the plywood thus obtained is inferior to non-joint plywood in strength, and therefore plywood containing such connection joints therein lacks product reliability in respect of strength thereof. Though it is technically possible to provide sufficiently strong joints in plywood, this would inevitably degrade the yield involved in plywood production, thereby inviting an increase of production cost. In this way, it is safe to say that plywood with joints has been manufactured heretofore at the sacrifice of strength that is an important property of plywood. As a result, the scope of use of such plywood has been limited to some particular applications which do not call for strength requirement.

SUMMARY OF THE INVENTION

An object of this invention is to remove the above-mentioned disadvantage of conventional plywood with joints by providing improved and novel plywood in which veneers that are too short for any desired lengths of plywood product are jointed by lapping one end of a veneer on an adjacent end of the other veneer so as to meet the length requirement.

Another object of the invention is to make possible forming long plywood panels with sufficient strength, but with the least reduction of yield and the minimum production cost.

The above and other objects, features and advantages of the invention will become apparent to those skilled in the art from the following detailed description of embodiments of the present invention, taken in conjunction with the accompanying drawings, wherein:

BRIEF DESCRIPTION OF THE DRAWINGS

FIGS. 1, 2, 9, 10, 15, 26, 48, 61, 77, 92 and 95 are fragmental perspective views showing various embodiments of plywood according to the invention, respectively;

FIGS. 3 to 8, 11 to 14, 16 to 25, 27 to 47, 49 to 60, 62 to 76, and 78 to 89, inclusive, are fragmental sectional views showing various embodiments of plywood according to the invention, respectively;

DETAILED DESCRIPTION OF THE PREFERRED EMBODIMENTS

Figure 3:
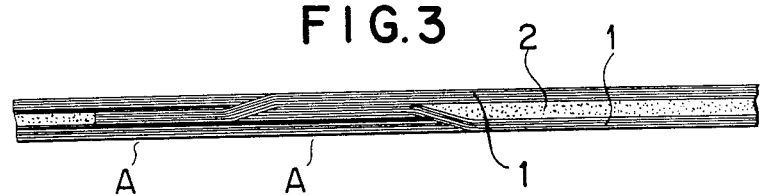
Figure 4:
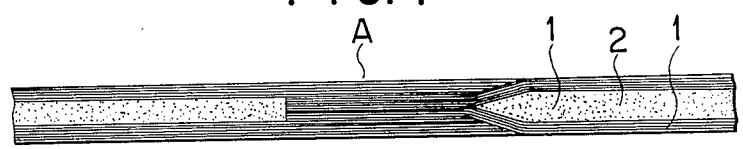

For understanding of plywood embodied according to the present invention, reference is had to FIG. 1 which shows a simple three-ply panel of plywood in a fragmental view. Apparently from the illustration, veneers which are short in grain direction thereof for a desired length of the plywood panel are used as face veneers which are designated by a reference numeral 1 and they are jointed on both top and bottom sides of the panel in an end-to-end manner by lapping one face veneer 1 on the other at their adjacent ends thereby to form a joint which is designated generally by a reference letter symbol "A". Cross veneers which form the core ply of the three-ply panel are interposed between the two opposite face veneers 1 and glued thereto. As seen clearly in FIG. 1, the cross veneers 2 are arranged between the face veneers 1, but not interposed therebetween at the joints "A" so that the joint portion "A" may have substantially the same thickness as the remaining non-joint portion, which is referred to hereinafter as "standard portion" of plywood panel. As shown in FIG. 1, two joints "A" formed at two different locations spaced from one another are of substantially the same configuration, differing only in that the joint "A" on the left-hand side (as viewed in FIG. 1) is formed by end-lapping the face veneers 1 on the upper side of the plywood, while the other joint "A" on the right-hand side is formed by the face veneers 1 end-lapped on the opposite lower side thereof. If circumstances permit, either of the joints "A" may be dispensed with by using short face veneers 1 only on one side of the plywood panel. Furthermore, the joints "A" in plywood may be formed either in an equidistant relation to each other or, if required, in an irregularly spaced relation. In addition, end-lapping relation of one face veneer 1 over the other may be reversed in any of the joints "A". Any two adjacent joints "A" may be also formed at a single location in plywood without separating them, as exemplified in FIGS. 2 and 3. By so doing, it becomes possible to prepare the ends of cross veneers 2, or the widthwise ends thereof, at a right angle without beveling, as shown clearly in FIG. 2.

As it is now apparent from the above description, the plywood according to the embodiment of the present invention will contain at least one joint "A" in any of the forms which have been already shown in the above or are to be disclosed in later part hereof.

Tables 1 and 2 are provided and designed to formulate a number of embodiments, if not all, of the present invention, as classified by the number of plies and the combination of ply thicknesses in five-ply construction. The following will further detail the various embodiments of the invention with reference to these Tables along with the drawings:

TABLE 1

| PLYWOOD'S STANDARD & JOINT PORTIONS | | THICKNESS RATIO OF COMPONENT VENEERS | | | | |
|---|---|---|---|---|---|---|
| | | FACE VENEER | CROSS VENEER | FACE VENEER | | |
| 3-PLY | | | | | | |
| STANDARD PORTION | | 1 | X | 1 | | |
| JOINT PORTION | 1 | 1 + 1 | X | 1 | | |
| | 2* | 1 + 1 | O | 1 | | |
| | 3 | 1 + 1 | X | 1 + 1 | | |
| | 4 | 1 + 1 | O | 1 + 1 | | |
| | | FACE VENEER | CROSS VENEER | CROSS VENEER | FACE VENEER | |
| 4-PLY | | | | | | |
| | | 1 | $X_1$ | $X_2$ | 1 | |
| | 1 | 1 + 1 | $X_1$ | $X_2$ | 1 | |
| | 2* | 1 + 1 | $X_1$ | O | 1 | |
| | 3* | 1 + 1 | O | $X_2$ | 1 | |
| | 4 | 1 + 1 | O | O | 1 | |
| | 5 | 1 + 1 | $X_1$ | $X_2$ | 1 + 1 | |
| | 6 | 1 + 1 | $X_1$ | O | 1 + 1 | |
| | 7 | 1 + 1 | O | $X_2$ | 1 + 1 | |
| | 8 | 1 + 1 | O | O | 1 + 1 | |
| | | FACE VENEER | CROSS VENEER | LONGITUDINAL VENEER | CROSS VENEER | FACE VENEER |
| 5-PLY (A) | | | | | | |
| STANDARD PORTION | | 1 | $X_1$ | $Y_1$ | $X_2$ | 1 |
| JOINT PORTION | 1 | 1 + 1 | $X_1$ | $Y_1$ | $X_2$ | 1 |
| | 2* | 1 + 1 | $X_1$ | $Y_1$ | O | 1 |
| | 3* | 1 + 1 | $X_1$ | O | $X_2$ | 1 |
| | 4 | 1 + 1 | $X_1$ | O | O | 1 |
| | 5* | 1 + 1 | O | $Y_1$ | $X_2$ | 1 |
| | 6 | 1 + 1 | O | $Y_1$ | O | 1 |
| | 7 | 1 + 1 | O | O | $X_2$ | 1 |
| | 8 | 1 + 1 | O | O | O | 1 |
| | 9 | 1 + 1 | $X_1$ | $Y_1$ | $X_2$ | 1 + 1 |
| | 10 | 1 + 1 | $X_1$ | $Y_1$ | O | 1 + 1 |
| | 11 | 1 + 1 | $X_1$ | O | $X_2$ | 1 + 1 |
| | 12* | 1 + 1 | $X_1$ | O | O | 1 + 1 |
| | 13 | 1 + 1 | O | $Y_1$ | $X_2$ | 1 + 1 |
| | 14* | 1 + 1 | O | $Y_1$ | O | 1 + 1 |
| | 15* | 1 + 1 | O | O | $X_2$ | 1 + 1 |
| | 16 | 1 + 1 | O | O | O | 1 + 1 |

| PLYWOOD'S STANDARD & JOINT PORTIONS | | SUM OF THICKNESS | CONDITIONS OF THICKNESS UNIFORMITY | REFERENCE DRAWINGS |
|---|---|---|---|---|
| 3-PLY | | | | |
| STANDARD PORTION | | 2 + X | | |
| JOINT PORTION | 1 | 3 + X | UNSUCCESSFUL | |
| | 2* | 3 | X = 1 | 1~3 |
| | 3 | 4 + X | UNSUCCESSFUL | |
| | 4 | 4 | X = 2 | 4~8 |
| 4-PLY | | | | |
| | | 2 + $X_1$ + $X_2$ | | |
| | 1 | 3 + $X_1$ + $X_2$ | UNSUCCESSFUL | |
| | 2* | 3 + $X_1$ | $X_1$ = as desired $X_2$ = 1 | 9~12 |
| | 3* | 3 + $X_2$ | $X_1$ = 1, $X_2$ = as desired | |
| | 4 | 3 | $X_1$ + $X_2$ = 1 | 13, 14 |
| | 5 | 4 + $X_1$ + $X_2$ | UNSUCCESSFUL | |
| | 6 | 4 + $X_1$ | $X_1$ = as desired, $X_2$ = 2 | 15~17 |
| | 7 | 4 + $X_2$ | $X_1$ = 2, $X_2$ = as desired | |
| | 8 | 4 | $X_1$ + $X_2$ = 2 | 18, 19 |
| 5-PLY (A) | | | | |
| STANDARD PORTION | | 2 + $X_1$ + $Y_1$ + $X_2$ | | |
| JOINT PORTION | 1 | 3 + $X_1$ + $Y_1$ + $X_2$ | UNSUCCESSFUL | |
| | 2* | 3 + $X_1$ + $Y_1$ | $X_1$ = as desired, $Y_1$ = as desired, $X_2$ = 1 | 20, 21 |
| | 3* | 3 + $X_1$ + $X_2$ | $X_1$ = as desired, $Y_1$ = 1, $X_2$ = as desired | 22, 23 |
| | 4 | 3 + $X_1$ | $X_1$ = as desired, $Y_1$ + $X_2$ = 1 | 24, 25 |
| | 5* | 3 + $Y_1$ + $X_2$ | $X_1$ = 1, $Y_1$ = as desired, $X_2$ = as desired | 26, 27 |
| | 6 | 3 + $Y_1$ | $X_1$ + $X_2$ = 1, $Y_1$ = as desired | 28, 29 |
| | 7 | 3 + $X_2$ | $X_1$ + $Y_1$ = 1, $X_2$ = as desired | 30~32 |
| | 8 | 3 | $X_1$ + $Y_1$ + $X_2$ = 1 | 33, 34 |

TABLE 1-continued

| | | | |
|---|---|---|---|
| 9 | $4 + X_1 + Y_1 + X_2$ | UNSUCCESSFUL | 35, 36 |
| 10 | $4 + X_1 + Y_1$ | $X_1$ = as desired, $Y_1$ = as desired, $X_2$ = 2 | 37, 38 |
| 11 | $4 + X_1 + X_2$ | $X_1$ = as desired, $Y_1$ = 2, $X_2$ = as desired | 39, 40 |
| 12* | $4 + X_1$ | $X_1$ = as desired, $Y_1 + X_2$ = 2 | 41~44 |
| 13 | $4 + Y_1 + X_2$ | $X_1$ = 2, $Y_1$ = as desired, $X_2$ = as desired | 45~47 |
| 14* | $4 + Y_1$ | $X_1 + X_2$ = 2, $Y_1$ = as desired | 48~53 |
| 15* | $4 + X_2$ | $X_1 + Y_1$ = 2, $X_2$ = as desired | 54 |
| 16 | 4 | $X_1 + X_2 + Y_1$ = 2 | 55, 56 |

TABLE 2

| PLYWOOD'S STANDARD & JOINT PORTIONS | | THICKNESS RATIO OF COMPONENT VENEERS | | | | | | |
|---|---|---|---|---|---|---|---|---|
| | | FACE VENEER | CROSS VENEER | LONGITUDINAL VENEER | CROSS VENEER | FACE VENEER | | |
| 5-PLY (B) STANDARD PORTION | | 1 | $X_1$ | 1 | $X_2$ | 1 | | |
| JOINT PORTION | 1 | 1 + 1 | $X_1$ | 1 + 1 | O | 1 | | |
| | 2 | 1 + 1 | O | 1 + 1 | $X_2$ | 1 | | |
| | 3* | 1 + 1 | O | 1 + 1 | O | 1 | | |
| | 4 | 1 + 1 | $X_1$ | 1 + 1 | O | 1 + 1 | | |
| | 5 | 1 + 1 | O | 1 + 1 | $X_2$ | 1 + 1 | | |
| | 6 | 1 + 1 | O | 1 + 1 | O | 1 + 1 | | |
| | | FACE VENEER | LONGITUDINAL VENEER | CROSS VENEER | LONGITUDINAL VENEER | FACE VENEER | | |
| 5-PLY (C) STANDARD PORTION | | 1 | 1 | X | 1 | 1 | | |
| JOINT PORTION | 1* | 1 + 1 | 1 | O | 1 | 1 | | |
| | 2 | 1 + 1 | 1 | O | 1 | 1 + 1 | | |
| | 3 | 1 + 1 | 1 + 1 | O | 1 | 1 | | |
| | 4 | 1 + 1 | 1 + 1 | O | 1 | 1 + 1 | | |
| | 5 | 1 + 1 | 1 + 1 | O | 1 + 1 | 1 | | |
| | 6 | 1 + 1 | 1 + 1 | O | 1 + 1 | 1 + 1 | | |
| | | FACE VENEER | CROSS VENEER | LONGITUDINAL VENEER | CROSS VENEER | LONGITUDINAL VENEER | CROSS VENEER | FACE VENEER |
| 7-PLY STANDARD PORTION | | 1 | X | 1 | X | 1 | X | 1 |
| JOINT PORTION | 1* | 1 + 1 | X | 1 | X | 1 | O | 1 |
| | 2* | 1 + 1 | X | 1 | O | 1 | X | 1 |
| | 3 | 1 + 1 | X | 1 | O | 1 | O | 1 |
| | 4* | 1 + 1 | O | 1 | X | 1 | X | 1 |
| | 5 | 1 + 1 | O | 1 | X | 1 | O | 1 |
| | 6 | 1 + 1 | O | 1 | O | 1 | X | 1 |
| | 7 | 1 + 1 | O | 1 | O | 1 | O | 1 |
| | 8 | 1 + 1 | X | 1 | X | 1 | O | 1 + 1 |
| | 9 | 1 + 1 | X | 1 | O | 1 | X | 1 + 1 |
| | 10* | 1 + 1 | X | 1 | O | 1 | O | 1 + 1 |
| | 11 | 1 + 1 | O | 1 | X | 1 | X | 1 + 1 |
| | 12* | 1 + 1 | O | 1 | X | 1 | O | 1 + 1 |
| | 13* | 1 + 1 | O | 1 | O | 1 | X | 1 + 1 |
| | 14 | 1 + 1 | O | 1 | O | 1 | O | 1 + 1 |
| | 15* | 1 + 1 | X | O | X | O | X | 1 + 1 |

| PLYWOOD'S STANDARD & JOINT PORTIONS | | SUM OF THICKNESS | CONDITIONS OF THICKNESS UNIFORMITY | REFERENCE DRAWINGS |
|---|---|---|---|---|
| 5-PLY (B) STANDARD PORTION | | $3 + X_1 + X_2$ | | |
| JOINT PORTION | 1 | $5 + X_1$ | $X_1$ = as desired, $X_2$ = 2 | 57 |
| | 2 | $5 + X_2$ | $X_1$ = 2, $X_2$ = as desired | 58 |
| | 3* | 5 | $X_1 + X_2$ = 2 | 59~61 |
| | 4 | $6 + X_1$ | $X_1$ = as desired, $X_2$ = 3 | 62 |
| | 5 | $6 + X_2$ | $X_1$ = 3, $X_2$ = as desired | 63 |
| | 6 | 6 | $X_1 + X_2$ = 3 | 64 |
| 5-PLY (C) STANDARD PORTION | | $4 + X$ | | |
| JOINT PORTION | 1* | 5 | X = 1 | 65, 66 |
| | 2 | 6 | X = 2 | 67 |
| | 3 | 6 | X = 2 | 68 |
| | 4 | 7 | X = 3 | 69 |
| | 5 | 7 | X = 3 | 70 |
| | 6 | 8 | X = 4 | 71 |
| 7-PLY STANDARD PORTION | | $4 + 3X$ | | |
| JOINT PORTION | 1* | $5 + 2X$ | X = 1 | 72, 73 |

TABLE 2-continued

|  |  |  |  |
|---|---|---|---|
| 2* | 5 + 2X | X = 1 | 74 |
| 3 | 5 + X | X = 0.5 | 75 |
| 4* | 5 + 2X | X = 1 | 76, 77 |
| 5 | 5 + X | X = 0.5 | 78 |
| 6 | 5 + X | X = 0.5 | 79 |
| 7 | 5 | X = 0.33 | 80 |
| 8 | 6 + 2X | X = 2 | 81 |
| 9 | 6 + 2X | X = 2 | 82 |
| 10* | 6 + X | X = 1 | 83 |
| 11 | 6 + 2X | X = 2 | (81) |
| 12* | 6 + X | X = 1 | 84 |
| 13* | 6 + X | X = 1 | 85 |
| 14 | 6 | X = 0.66 | |
| 15* | 4 + 8X | X = as desired | 86 |

Firstly referring to the three-ply group in Table 1, the column entitled "PLYWOOD'S STANDARD & JOINT PORTIONS" is provided therein to draw readers' attention to the fact that the plywood of the present invention includes the above-mentioned "Standard Portion" and "Joint Portion". As listed, one form of standard portion and four different forms of joint portion, as numbered by "1" to "4", are provided for the three-ply group. Thus, for reference to any specific forms of joint, they are referred to hereinafter as "joint form 1", "joint form 2", etc.

The next column that is entitled "THICKNESS RATIO OF COMPONENT VENEERS" in the Table is designed to indicate the thickness ratio of individual component veneers of plywood at the standard and joint portions, respectively, wherein the face veneer thickness is indicated by "1" as the basic unit and the cross veneer thickness by "X" (or unknown). Indication "1+1" for the face veneer in the column means that two adjacent short face veneers are end-jointed in a lapped form; while "1" indicates that a single sheet of face veneer is merely laid up straight without lap connection at the joint "A". Indication "0" for the cross veneer in the column means that it is missing at the joint "A", or the joint "A" is void of such cross veneer (e.g. joint forms 2 and 4); "X" indicates that the cross veneer is laid for lamination at the joint "A" (e.g. joint forms 1 and 3). In this way, this column exemplifies various arrangements of plywood's component veneers.

In the third column entitled "SUM OF THICKNESSES" are provided the sums of thicknesses obtainable from the previous column THICKNESS RATIO OF COMPONENT VENEERS by adding all the thicknesses indicated in each of the items.

The conditions under which the thickness of the joint portion of plywood becomes equal to that of the standard portion thereof, therefore the conditions under which plywood panel with a uniform thickness is obtained, are given in the subsequent column entitled "CONDITIONS OF THICKNESS UNIFORMITY". Such conditions are provided by specifying the thickness for "X" in relation to the thickness unit "1" of the face veneer. It should be understood here that the resultant value for "X" or the like in this column merely represents a reference value. In other words, since deformation of veneers is unavoidable in actual plywood manufacturing practice, the value for "X" or the like has a certain range of allowances.

The numerals in the last column entitled "REFERENCE DRAWINGS" indicate the drawings which show the corresponding joint forms in plywood.

If reference is had specifically to Table 1, the description of plywood which had been already presented in connection with FIGS. 1 to 3 may be translated as follows: Referring to "1-3" in REFERENCE DRAWINGS, the plywood in question is of three-ply construction having the joint "A" which belongs to "joint form 2". At the joint, the face veneer on one side of the plywood has a lapped section, as indicated by "1+1" in THICKNESS RATIO OF COMPONENT VENEERS, but the face veneer on the other opposite side of the plywood panel is merely laid up without being lapped, as signified by "1". As indicated by "0", the cross veneer is missing between the upper and lower face veneers at the joint. Indication "X=1" in CONDITIONS OF THICKNESS UNIFORMITY requires the cross veneer to have a thickness which is substantially equal to that of the face veneer. In this way, these symbolized indications in the Table reveal various ways in which the component veneers are assembled at the joint and standard portions of plywood according to the various embodiments of the present invention.

Then, the plywood panels which are shown in FIGS. 4 to 8 will be explained by way of the indicative descriptions in Table 1. These panels are also of three-ply construction having the joint "A" which is associated with the "joint form 4". At such joint "A", the face veneers 1 on both sides thereof are end-lapped one on the other, as "1+1" for both top and bottom plies of veneer in THICKNESS RATIO OF COMPONENT VENEERS, and the joint "A" is void of cross veneer 2, as "0" in the same column. To fulfill the requirement of thickness uniformity of such plywood, the cross veneer 2 must have a thickness which is substantially double that of the face veneer 1, as "X=2" in CONDITIONS OF THICKNESS UNIFORMITY.

Figure 5:
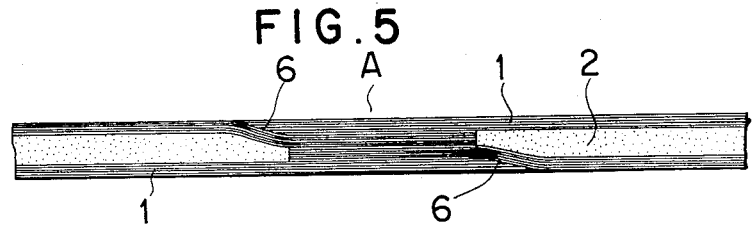
Figure 6:
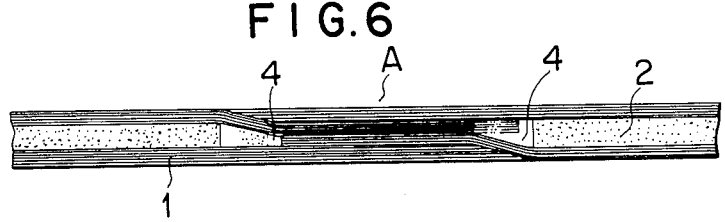

Referring specifically to an embodiment of FIG. 6, though the same is true of other embodiments of the invention, hollowed section or space 4 may be formed in the vicinities of the joint "A", as required, by using cross veneers 2 which are smaller in widthwise dimension than the counterparts in the corresponding embodiment shown in FIG. 5. This sort of space 4 may be formed not only by dimensional shortage of cross veneer 2, but also by the conditions of veneers being lapped for joint, and further by shape or lapping and gluing conditions of the longitudinal veneer that composes with the cross veneer the core stock or inner layer of plywood. As to such space 4, therefore, it is to be understood that the present invention is not intended to limit the presence or absence, dimensions, shape, position, etc. thereof.

Figure 7:
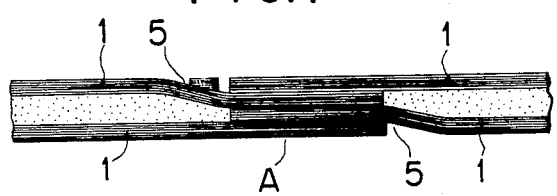

When required, face veneers 1 with squared ends may be lapped together to form a joint "A" as shown in FIG. 7 with the result that the plywood thus obtained will be formed with recesses 5 on both surfaces thereof. If such recesses 5 are not desirable in view of plywood quality requirement, they may be remedied easily by applying any suitable fillers such as putty or any kinds of synthetic resin or by covering up with any convenient overlays such as fancy veneer sheets, resin sheets, or any other suitable sheet materials. It is desired, however, that formation of such recesses 5 should be prevented by previously providing a beveled edge 6 on the longitudinal end of face veneer as shown in FIG. 5. As to the dimensions and shape of such bevels 6, it is essential that they should be designed properly with the extent of deformation of the inner plies of veneer caused by contacting pressure exerted by the beveled face when the joint "A" is assembled securely taken into account. These bevels 6 may be most conveniently formed by cutting into a log with a spur knife in an inclined setting on a rotary lathe while veneer is being peeled on the lathe.

Figure 8:
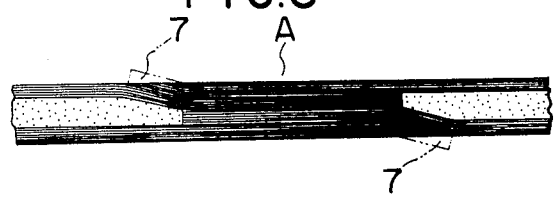
Figure 10:
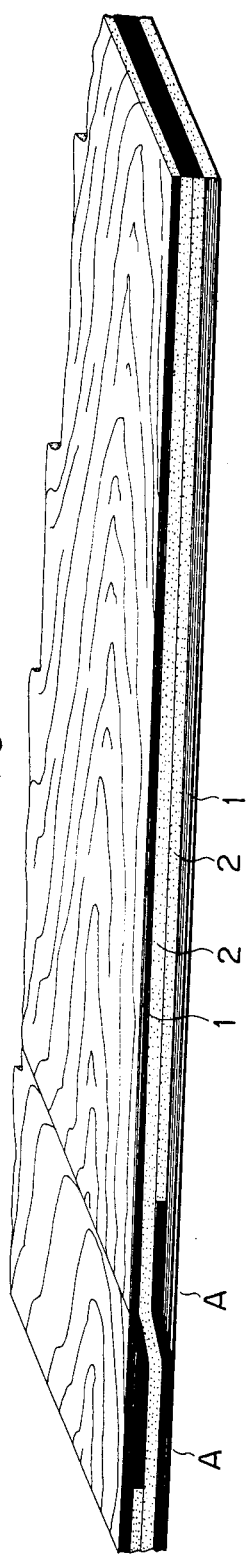
Figure 15:
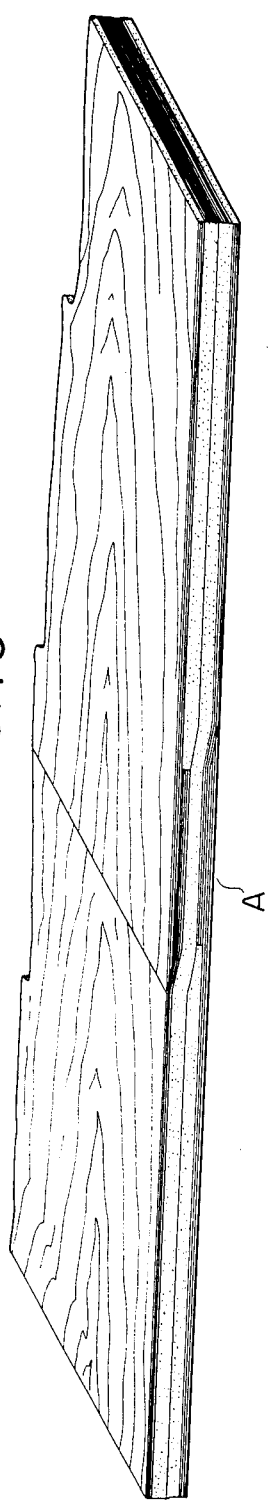
Figure 27:
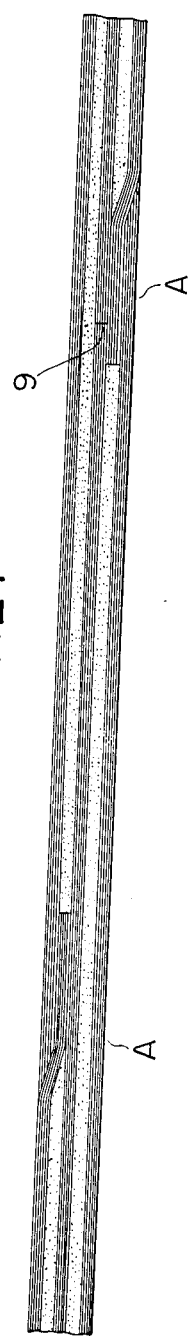
Figure 11:
Figure 12:
Figure 13:
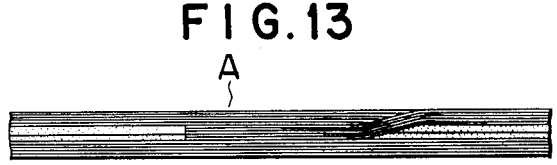
Figure 14:
Figure 16:
Figure 17:
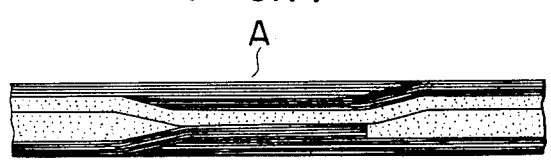
Figure 18:
Figure 19:
Figure 20:
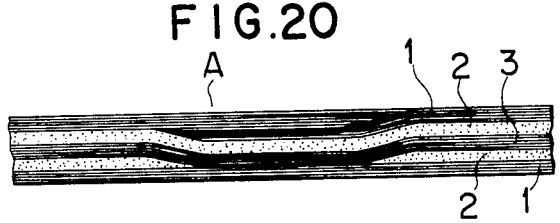
Figure 21:
Figure 22:
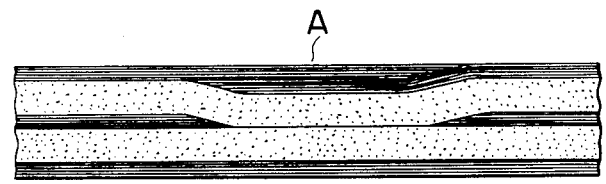
Figure 23:
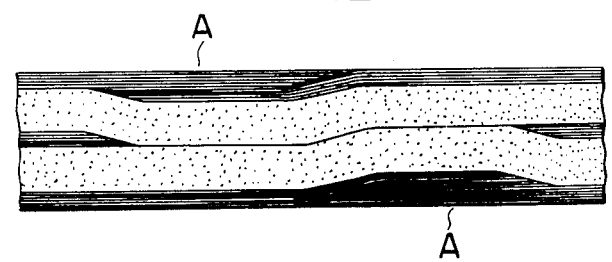
Figure 24:
Figure 25:
Figure 28:
Figure 29:
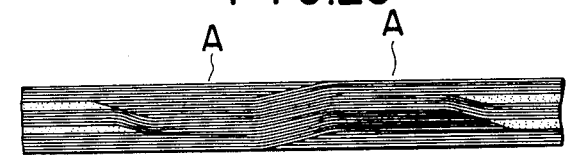
Figure 30:
Figure 31:
Figure 32:
Figure 33:
Figure 34:
Figure 35:
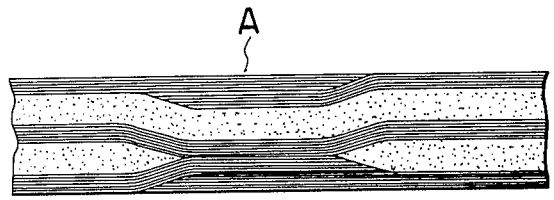
Figure 36:
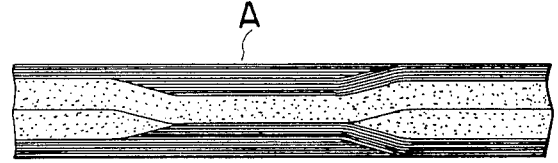
Figure 37:
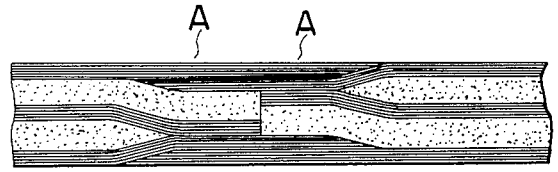
Figure 38:
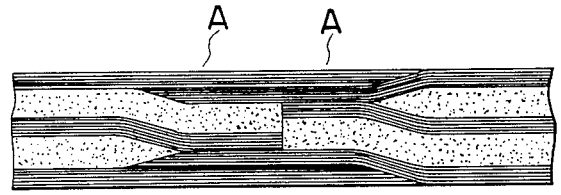
Figure 39:
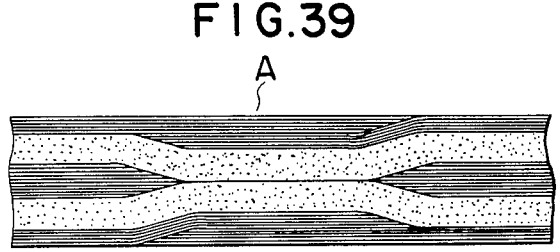
Figure 40:
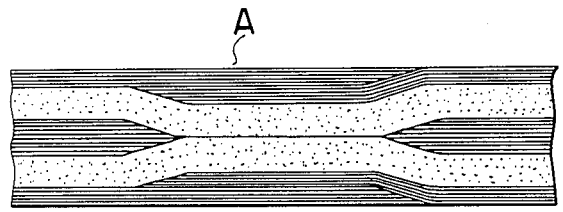
Figure 41:
Figure 42:
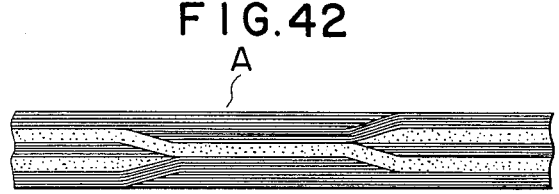
Figure 43:
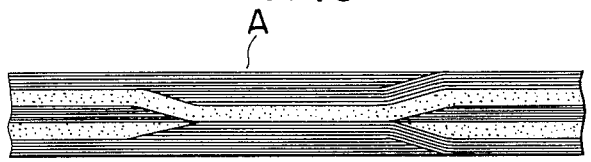
Figure 44:
Figure 45:
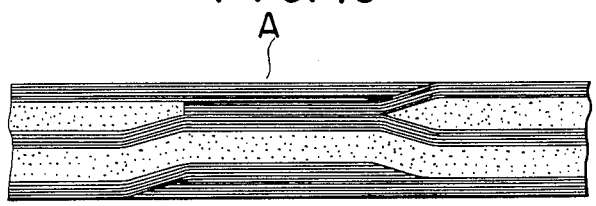
Figure 46:
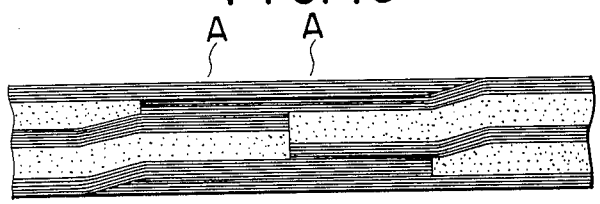
Figure 47:
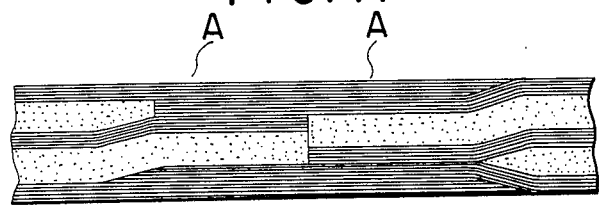
Figure 49:
Figure 50:
Figure 51:
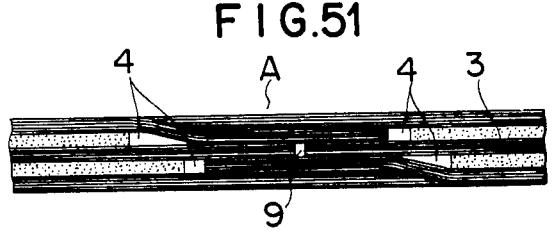
Figure 52:
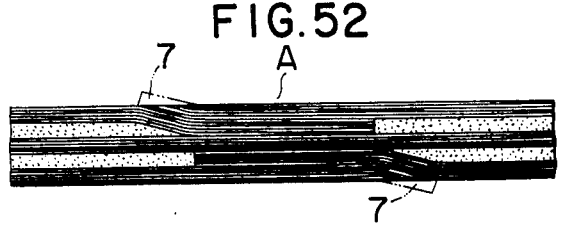
Figure 53:
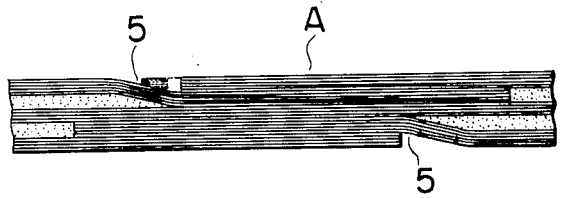
Figure 54:
Figure 55:
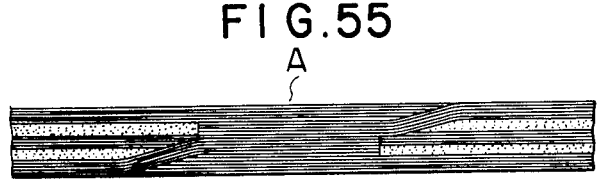
Figure 56:
Figure 57:
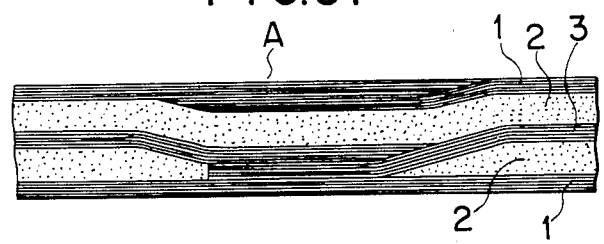
Figure 58:
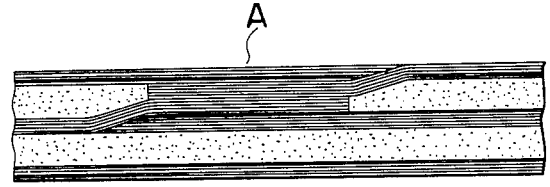
Figure 66:
Figure 67:
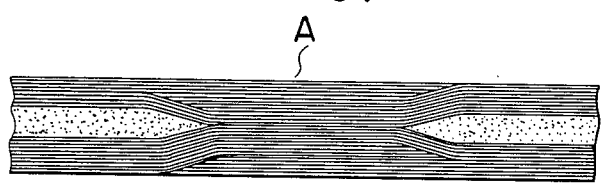
Figure 68:
Figure 69:
Figure 70:
Figure 71:
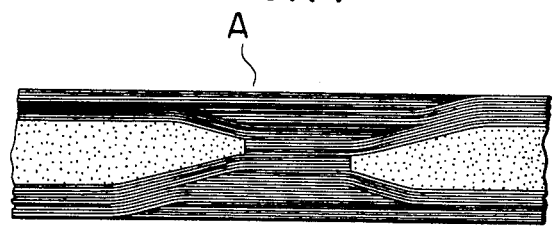
Figure 72:
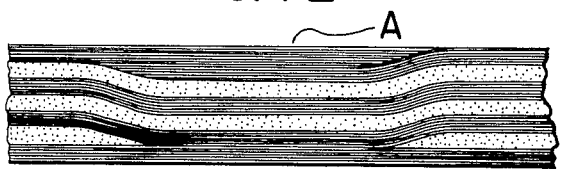
Figure 73:
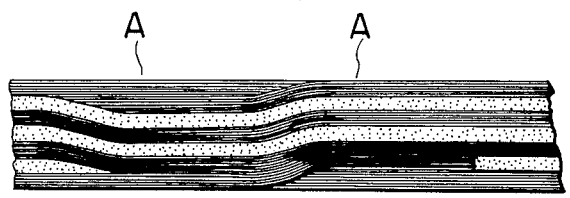
Figure 74:
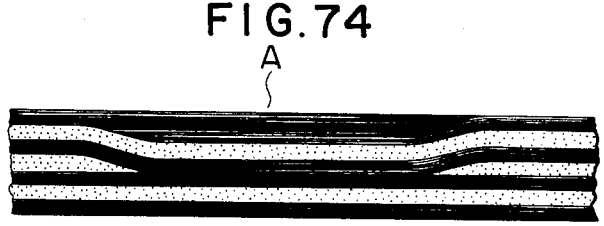
Figure 75:
Figure 76:
Figure 78:
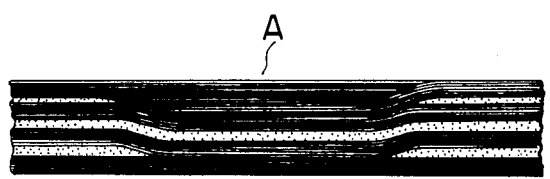
Figure 79:
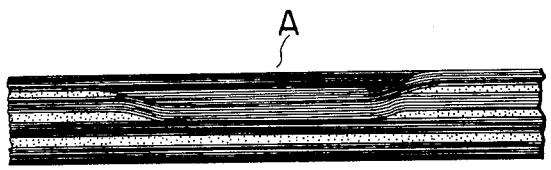
Figure 80:
Figure 81:
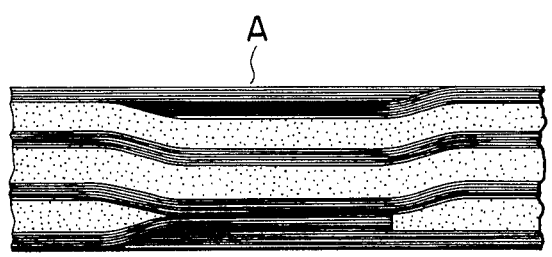
Figure 82:
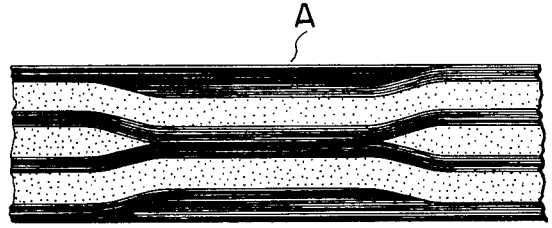
Figure 83:
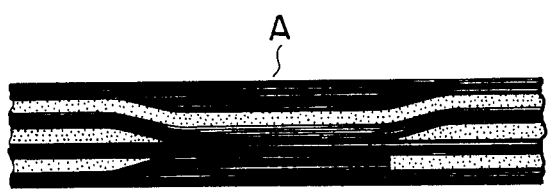
Figure 84:
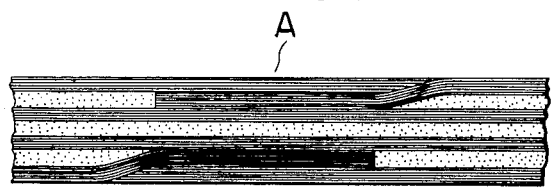
Figure 85:
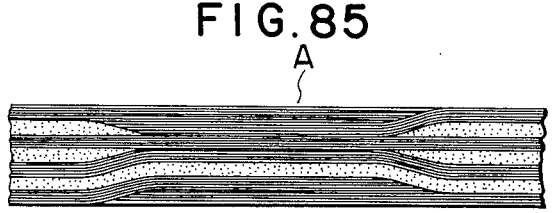
Figure 86:

If lapping of face veneers is made in such a way that the joint "A" is formed with projections 7 as shown by phantom lines in FIGS. 8, these excess projecting portions 7 may be removed easily by cutting or grinding operation. The butt end formed on the face veneer by such excess removing (FIG. 8) is similar to that of the face veneer in FIG. 5, but differing only in that the face veneer in one embodiment (e.g. FIG. 8) is placed in an upside-down position in comparison with the face veneer in the other embodiment (FIG. 5).

We will now proceed to the four-ply group in Table 1. As it is apparent from the description in THICKNESS RATIO OF COMPONENT VENEERS for the standard portion thereof, the plywood in this four-ply group includes at its standard section two plies of cross veneer 2 having thicknesses "$X_1$" and "$X_2$", respectively, parallel laminated each other and interposed between the upper and lower plies of face veneer 1 in a cross-grain relation thereto. As listed in the Table, eight different joint forms, as numbered "1" to "8", are exemplified in this group. The table may be consulted in the same way as in the case of previous three-ply group, but new indications such as "X=As desired" in CONDITIONS OF THICKNESS UNIFORMITY means that the cross veneer thus indicated may have any desired thickness regardless of the face veneer thickness, and "$X_1+X_2=1$" means that the thickness of the individual cross veneers may have any thicknesses as far as the sum of "$X_1$" and "$X_2$" becomes equal to the face veneer thickness "1". Those joints "A" in four-ply group which are described in Table 1 are illustratively shown in FIGS. 9 to 19.

Though not shown in any of the drawings, a panel composed of four-ply parallel laminated veneers and having the joint "A" according to the embodiments of the present invention may be made merely by using only longitudinal veneers in place of cross veneers. To express such composition of panel, "Cross Veneer" may be changed newly to "Longitudinal Veneer" in the column THICKNESS RATIO OF COMPONENT VENEERS, and the grain pattern of cross veneers shown in FIGS. 9 to 19 is so changed that it represents not the cross veneer, but the longitudinal veneer. Such changes in table and drawings are applicable not only to the four-ply group, but also to the previously-described three-ply panels and others which are to be covered in later part hereof. It is to be definitely understood that all such panels composed of parallel laminated veneers (or ply) shall belong to plywood and therefore fall within the scope of this invention.

Then, the following will describe the embodiments of five-ply plywood (A) listed in Table 1 and shown in FIGS. 20 to 56, respectively. Referring to the column THICKNESS RATIO OF COMPONENT VENEERS in respect of the standard portion and the relevant drawings, the plywood in this five-ply group is composed of two plies of face veneer 1 each having a thickness "1", two plies of cross veneer 2 with thickness "$X_1$" and "$X_2$", respectively, and a single ply of center longitudinal veneer 3 whose thickness is indicated by "$Y_1$". How the component plies of veneer are arranged at the joint "A" is formulated for each of the sixteen joint forms (as numbered "1" to "16") in the column THICKNESS RATIO OF COMPONENT VENEERS in respect of the joint portion, and the relative thicknesses of "$X_1$", "$X_2$" and "$Y_1$" necessary for the thickness uniformity of plywood are shown in the column CONDITIONS OF THICKNESS UNIFORMITY. The actual forms of joint "A" are illustrated by drawings including FIGS. 20 to 56, inclusive, which are indicated in REFERENCE DRAWINGS.

The next five-ply plywood (B) in Table 2 differs from the counterpart plywood (A) in that the former uses at the standard portion thereof a single ply of center longitudinal veneer 3 having the same thickness as the face veneer 1, and assumes that this longitudinal veneer 3 is also used for forming a lapped section at the joint portion "A" of the plywood. Examples of the actual joint forms 1–6 in this group are shown in FIGS. 57 to 64, respectively.

For the sake of simplicity of tabulation, such joints that will turn out "unsuccessful" are omitted from the list in Tables. The "unsuccessful" joint, which had been already used in CONDITIONS OF THICKNESS UNIFORMITY in respect of the plywood of preceding groups in Table 1, e.g. joint forms 1 and 3 of three-ply group, means that the joint portion "A" fails to correspond in thickness to the standard portion, thus thickness uniformity of plywood being unobtainable. When manufacturing such "unsuccessful" plywood, however, it is desirable that at least one face side of the plywood be provided with substantial flatness. To fulfill this requirement, a press, for example, for hot-pressing arranged veneers may be so designed that pressing plate on one side is made of elastic material and the plate on the other side is made of solid and rigid material so that the veneers at the joint and its vicinities, when pressed, will be glued together while making deformation to conform to the flat plane of the solid pressing plate.

We will then proceed to five-ply plywood (C) whose embodiments are indicated and shown in Table 2 and FIGS. 65 to 71, respectively. The standard portion thereof is composed of a single layer of cross veneer 2 at the center and parallel laminated face and longitudinal veneers 1, 3 both having the same thickness, on both top and bottom sides of the panel. This group of plywood assumes that the cross veneer 2 is void at the joint portion "A", and five different joint forms are exemplified in the Table.

As to the last seven-ply plywood whose embodiments are indicated in Table 2 and shown in FIGS. 72 to 86, the component plies of veneer at the standard portion thereof include in crossbanding arrangement two face and longitudinal veneers 1 and 3, respectively, both of which have the same thickness, and three plies of cross veneer 2 all of which are of the same thickness. As listed in Table 2, fifteen different joint forms are exemplified.

For your reference convenience, the joint forms with asterisk "*" in Tables means that plywood with such joint forms may use the same thickness for all the component plies of veneer, and the same thing is true of the joint forms thus marked in other preceding groups of plywood. Apparently, this advantage making possible use of the same thickness for all component veneers can contribute greatly to simplification of production process and, therefore, reduction of cost involved in manufacturing plywood according to the embodiments of the present invention. If required, a single panel of plywood may have joints "A" of various different forms incorporated therein. In seven-ply panels in Table 2, for example, two joint forms as numbered "1" and "2" therein, both of which are provided with asterisk, may coexist in a single panel of plywood. Different joint forms which may coexist in a single panel are not limited only to those forms which are provided with asterisk in Tables, but basically all joint forms are applicable to such coexistence, provided that such joint forms are made in plywood having standard portion of identical construction in terms of number, thickness and manner of arrangement of component plies of veneer, whereby in some instances the number of different lengths of veneer to be peeled may be reduced.

Figure 87:
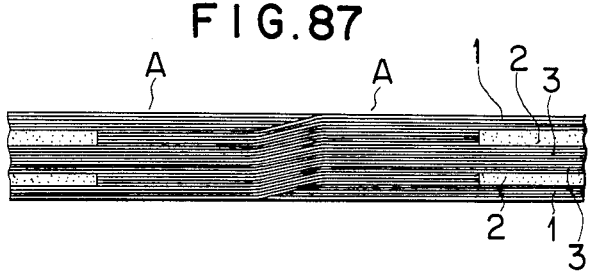

An embodiment shown in FIG. 87 discloses an example of six-ply panel. Though detailed indications of thickness ratio of component veneers in respect of the six-ply construction are omitted from Tables, a table therefor may be formulated by firstly specifying the manner of arranging the six plies of veneer at the standard portion and then at the joint "A" for various forms of joint in the same way as Tables 1 and 2. Thus, the embodiment of FIG. 87 is a mere example of six-ply panel according to the invention. Therefore, a complete table and drawings associated thereto may be made by contemplating various combinations of thickness and arrangement of component veneers.

As it is now apparent to those skilled in the art, it is practically possible to contemplate and select plywood of the invention having any desired construction other than those which are shown by the accompanying drawings and listed in Tables by using the above-described procedure of table making. For example, seven-ply plywood unshown in Table 2, plywood with eight or more number of plies, etc. may be formed by using the same procedure disclosed herein. In other words, this specification of the invention is designed to reveal a number of drawings showing various embodiments, Tables 1 and 2, and the procedure in which such tables are made, for disclosing plywood with any desired number of plies and arrangement thereof, as well as those which are covered herein.

Figure 88:
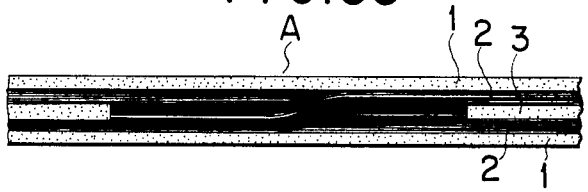

Referring to FIG. 88 showing a section across the grain of face veneer, the face veneers 1 are merely laminated to the inner layer, but the cross veneers 2 are placed in lapped relation to each other at the longitudinal ends thereof to form the joint "A". According to the present invention, therefore, veneers to be lapped at their longitudinal ends may be arbitrarily selected from the component veneers including cross veneers, as well as the face and longitudinal veneers.

Figure 89:
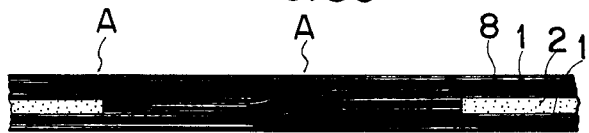
Figure 90:
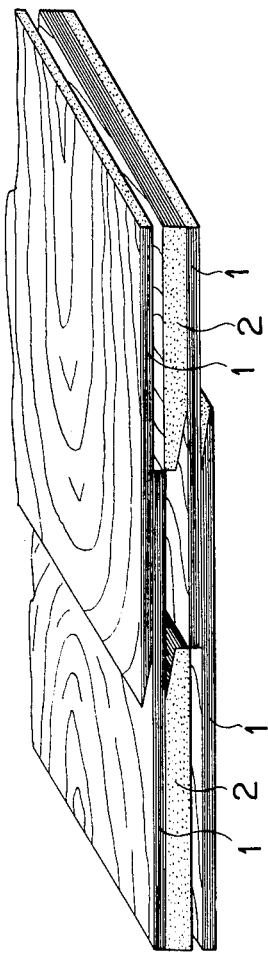
FIGS. 90 and 93 are fragmental perspective views exemplifying the manner of arrangement of individual veneers for manufacturing plywood of the invention, respectively.
Figure 91:
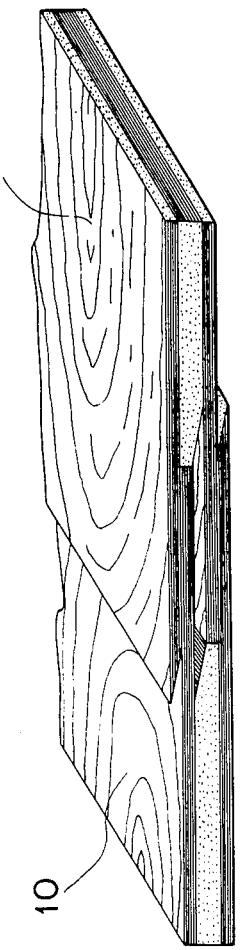
FIGS. 91 and 94 are views similar to FIGS. 90 and 93, but showing the manner of forming ends of in-process plywood and end-jointing them into a complete plywood panel of the invention, respectively.

Plywood shown in FIG. 89 as a further embodiment of the invention includes the plywood panel of FIG. 2 and an additional ply of veneer 8 which is parallel laminated to the top layer of face veneer 1. Though other similar embodiments are omitted from the illustration, any desired number of extra plies of veneer of any thickness and grain direction may be added on either or both of the faces of any of the plywood disclosed herein and others.

Furthermore, cross and longitudinal veneers 2, 3 which are used to constitute the inner layer of plywood may have end- or side-jointed connection formed therein so as to permit the use of short veneer pieces for such inner layer of plywood. In embodiments shown in FIGS. 26, 27, 48, 49 and 51, the longitudinal veneer 3 employs short ones which are end-jointed by butt, scarf or finger joint or are merely placed close to each other with a slight void left between the adjacent ends thereof, and such connections including incomplete one (such as the one shown in FIG. 51) are designated by a reference numeral 9. The location of such connection 9, whether it is formed in the joint "A" or standard portion of plywood, is not limited by this invention. In actual plywood manufacturing practice which often requires veneer for use to be standardized in length, however, the connection 9 would be formed advantageously within the joint "A". It is a matter of course that, if strength of the joint "A" is a prime concern, the connections 9 should be located somewhere in the standard portion of plywood or dispersed as much as possible through the plywood length. Though the relevant drawings provide connections 9 in longitudinal veneer 3 only, the same is true of cross veneer 2, in which case side-joint connection would be advantageously used. However, either of the end- and side-jointed connections is applicable to any component veneers.

Plywood panel with joint "A" in which the longitudinal extreme ends of face veneers 1 which appear on said face veneers on both top and bottom sides of the panel are positioned at about the center of lapped section along the grain, such as those panels shown in FIGS. 2, 10, 14, 34 61, 66, 77 and 87, can exhibit better strength against bending than others.

Figure 92:
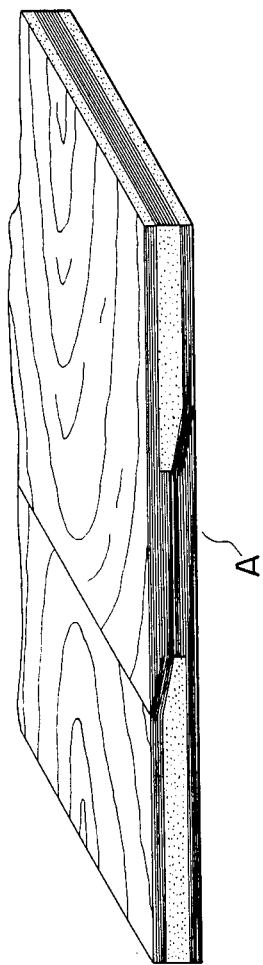
Figure 93:
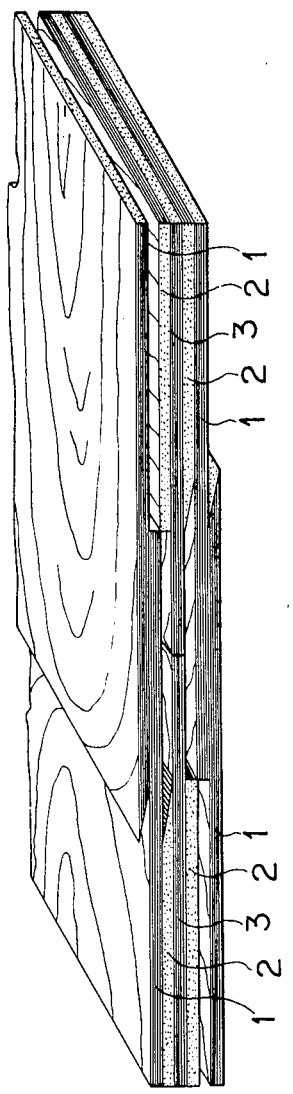
Figure 94:
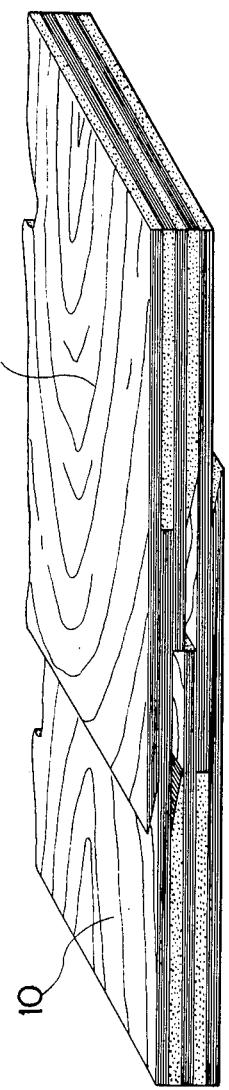
Figure 95:
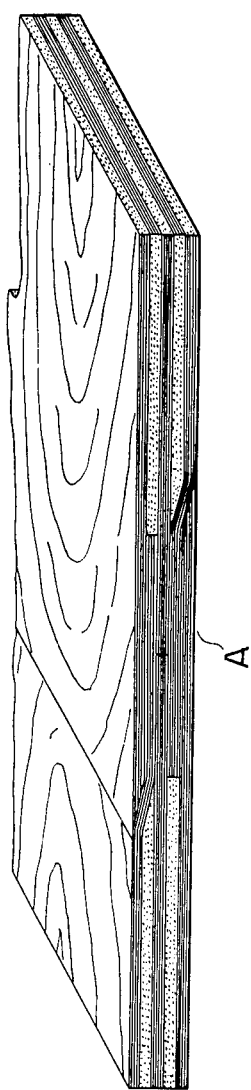

In FIGS. 90 to 95, inclusive, are exemplified specific phases of manufacturing process of plywood according to the present invention, the details of which are as follows:

To roughly classify, there are two contemplatable methods of manufacturing plywood of the invention, one of which is concerned primarily with assembling individual component veneers into a panel of finished plywood, and the other of which with preparing semi-finished panels and then glueing the ends of such in-process panels into finished plywood with a desired length. According to the former method, component plies of veneers comprising face veneer 1, cross veneer 2 and longitudinal veneer 3, after being glue-spread, are arranged properly in such a way that a desired form of joint may be obtained, as exemplified in FIGS. 90 and 93, and the veneers thus arranged are then assembled by a hot press or the like so that both the standard and joint portions are formed simultaneously into complete plywood panels shown in FIGS. 92 and 95, respectively. This method may be performed, if desired, in a continuous line of plywood manufacturing, and the manufacturing process therefor may be designed on the basis of various known plywood manufacturing processes. On the other hand, when plywood of the invention is desired to be made by end-jointing semi-finished panels, ends of in-process panels 10 are prepared by shaping their ends into mating jointable forms, as exemplified in FIGS. 91 and 94, respectively, and such in-process panels 10 are end-jointed together by glue into a finished plywood panel having joint "A" formed therein as shown in FIGS. 92 and 95, respectively. Apparently, forming of the standard portion and joint portion of plywood to be manufactured by the second method will be performed independently of each other both in time and process. In designing the end shape of the in-process plywood 10 for obtaining joints "A" in FIGS. 92 and 95, as well as the same shown in other drawings, ease of processing, yield and quality of plywood, etc. must be taken into previous consideration. To permit end-jointing operation of in-process plywood panels 10 to be performed with a high degree of working efficiency, manufacturing process of said in-process plywood panel 10 should be designed carefully so that in making the in-progress panels 10 the ends thereof may be formed simultaneously and that only a little is left for furtherprocessing before complete ends are obtained. It is very convenient and cost-reducing if two matching ends of two in-process panels 10 are so designed as to have identical or symmetrical configurations as exemplified in FIGS. 91 and 94. In addition, provision of such identical or symmetrical ends can make possible continuous end-jointing of in-process panels 10. and therefore any desired length of plywood panel may be cut from the continuous panel of plywood.

In the plywood with joint of the present invention, the length of lapped section of any two veneers at the longitudinal ends thereof, though varying with the forms of joint, should preferably fall within the range of 5 to 300 times the thickness of the veneer for lapping, or more than 10 times the veneer thickness in view of stability in strength of plywood. As it is apparent from the nature of plywood construction of the invention, forming joints with lapped section having a length greater than the upper limit of the above range will not adversely affect the plywood yield. In this way, the plywood according to the present invention can be made economically, yet with sufficient strength, and expand the scope of applications and use thereof.

While the invention has been illustrated and described with reference to various specific embodiments thereof, it is to be understood by those skilled in the art that various changes in the details of construction or arrangement may be made without departing from the spirit and scope of the invention.

What I claim is:

1. Plywood comprising at least two standard sections each having multiple straight extending plies of veneer sheets glued together and at least one joint section wherein two contiguous ends of two adjacent veneer sheets forming the external opposite faces of said plywood are glued together lapping one on the other, at least one end of said two contiguous ends being beveled and the lapping distance being greater than the beveled distance, no veneer sheet extending and interposed between said veneer sheets forming said external opposite faces at said standard sections being present substantially over the distance of said joint section, so that the thickness of the joint sectionis made substantially equal to that of the standard sections.

2. Plywood as set forth in claim 1, wherein all said plies of veneer sheets are substantially of the same thickness.

3. Plywood as set forth in claim 1, wherein the said lapping distance for which said contiguous ends are lapped one on the other is more than 10 times the thickness of the veneer sheet having said contiguous ends.

4. Plywood as set forth in claim 1, wherein the said lapping distance for which said contiguous ends are lapped one on the other is from about 5 to 300 times the thickness of the venner sheet having said continguous ends.

5. Plywood as set forth in claim 1, wherein veneer sheet in any ply thereof includes at least one end-jointed connection.

* * * * *